US006976256B2

(12) United States Patent
Nishihara (10) Patent No.: US 6,976,256 B2
(45) Date of Patent: Dec. 13, 2005

(54) PIPELINE PROCESSING TYPE SHAPING APPARATUS AND ITS METHOD

(75) Inventor: Motoo Nishihara, Tokyo (JP)

(73) Assignee: NEC Corporation, Tokyo (JP)

( * ) Notice: Subject to any disclaimer, the term of this patent is extended or adjusted under 35 U.S.C. 154(b) by 720 days.

(21) Appl. No.: 09/864,300

(22) Filed: May 25, 2001

(65) Prior Publication Data

US 2001/0049711 A1 Dec. 6, 2001

(30) Foreign Application Priority Data

May 31, 2000 (JP) .............................. 2000-161349

(51) Int. Cl.[7] .......................... G06F 9/46; G06F 11/00
(52) U.S. Cl. ...................... 718/102; 718/100; 370/218
(58) Field of Search .... 718/1, 100–108; 709/200–253; 370/218

(56) References Cited

U.S. PATENT DOCUMENTS

| | | | |
|---|---|---|---|
| 5,327,432 A * | 7/1994 | Zein Al Abedeen et al. ..... | 370/348 |
| 5,557,609 A * | 9/1996 | Shobatake et al. ..... | 370/395.71 |
| 5,740,164 A * | 4/1998 | Liron ......................... | 370/316 |
| 6,442,135 B1 * | 8/2002 | Ofek .......................... | 370/229 |
| 6,467,004 B1 * | 10/2002 | Iwamura et al. ............ | 710/305 |
| 6,687,247 B1 * | 2/2004 | Wilford et al. ............. | 370/392 |

\* cited by examiner

*Primary Examiner*—Meng-Al T. An
*Assistant Examiner*—Kenneth Tang
(74) *Attorney, Agent, or Firm*—Whitham, Curtis & Christofferson, PC (57) ABSTRACT

A pipeline processing type shaping apparatus and method in which strict shaping processing can also be implemented for a connection at various speed by adding a simplified circuit configuration. A cache portion is provided that links with the processing of a pipeline processing portion, and this cache portion manages flow information of a packet that is being processed in the pipeline processing portion. When there is a packet that belongs to the same flow, the cache portion transfers a parameter to the pipeline processing portion assuming a virtual packet in which relevant packets are all connected. The pipeline processing portion executes pipeline processing based on this virtual parameter. Consequently, also for a flow at an optional peak-rate speed (reciprocal of the input packet interval that belongs to the same flow) and in any high-speed transmission path interface, a predetermined scheduling time by shaping can always be calculated in real time.

12 Claims, 10 Drawing Sheets

CONTENTS OF SIGNALS BETWEEN BLOCKS:

① SIGNALS BETWEEN PROCESSING BLOCKS IN PIPELINE PROCESSING PORTION
FLOW IDENTIFIER, PACKER IDENTIFIER, TK, L, P,PT; fbit, X, Y, Z, W, f2bit, Y2 AS INTERNAL CONVERSION

② FLOW IDENTIFIER AS MANAGEMENT MEMORY ADDRESS ; TK, L, P, RT AS DATA

③ PROCESSING BLOCK 1 → FLOW IDENTIFIER IN CACHE PORTION , CACHE PORTION → K, B IN PROCESSING BLOCK 1

④ PROCESSING BLOCK 2 → FLOW IDENTIFIER, PACKET LENGTH b IN CACHE PORTION

⑤ FLOW IDENTIFIER AS MANAGEMENT MEMORY ADDRESS, TOKEN ADDED VALUE TK,
TOKEN ADDITION INTERVAL L AS DATA, P = W AS NEW TOKEN VALUE, AND RT = Z AS NEW PREDETERMINED SCHEDULING TIME

⑥ PREDETERMINED SCHEDULING TIME Z, PACKET IDENTIFIER

⑦ PROCESSING BLOCK 7 → FLOW IDENTIFIER, PACKET LENGTH b IN CACHE PORTION

⑧ CURRENT TIME NT

FIG.5(A)

| FIELD CONFIGURATION FOR MANAGEMENT MEMORY | | | |
|---|---|---|---|
| TOKEN ADDED VALUE TK | TOKEN ADDITION INTERVAL L | TOKEN VALUE P | LATEST SCHEDULING TIME RT |

FIG.5(B)

| FIELD CONFIGURATION FOR INTERNAL REGISTER | | | |
|---|---|---|---|
| VALID-BIT | FLOW IDENTIFIER | NUMBER OF PACKETS K | PACKET LENGTH SUM TOTAL B |

FIG.5(C)

| FIELD CONFIGURATION FOR PREDETERMINED SCHEDULING TIME MEMORY | |
|---|---|
| PREDETERMINED SCHEDULING TIME | PACKET IDENTIFIER |

EXPLANATION OF VARIABLES :

① READ FROM MANAGEMENT MEMORY
TK = TOKEN ADDED VALUE
L = TOKEN ADDITION INTERVAL
P = TOKEN VALUE
RT = LATEST SCHEDULING TIME

② READ FROM CACHE PORTION
K = NUMBER OF PACKETS
B = PACKET LENGTH SUM TOTAL
valid-bit = REGISTER ENABLED
AND DISABLED ③ INTERNAL VARIABLES
fbit = IDENTIFICATION AS TO
WHETHER TOKEN IS SUFFICIENT
X = INSUFFICIENT TOKEN AMOUNT
Y = NUMBER OF NECESSARY TOKEN
ADDITION INTERVALS
Z = NEWLY PREDETERMINED
SCHEDULING TIME
W = NEW TOKEN VALUE
f2bit = NEWLY PREDETERMINED
SCHEDULING TIME
INDICATES CROSS REFERENCE BETWEEN
Z AND CURRENT TIME.
Y2 = Z AND NUMBER OF TOKEN ADDITION
ITEMS ADDED UNTIL CURRENT TIME ④ OTHERS
b = PACKET LENGTH OF PROCESSING PACKET
NT = CURRENT TIME

PIPELINE PROCESSING TYPE SHAPING APPARATUS AND ITS METHOD

BACKGROUND OF THE INVENTION

1. Field of the Invention

The present invention relates to a pipeline processing type shaping apparatus and its method, and, more particularly, to a predetermined scheduling time calculation system for determining a predetermined scheduling time of a packet or cell for every connection according to a pipeline processing system in an interface from trunk communication equipment to access communication equipment that constitute a network.

2. Description of the Related Arts

Due to the recent increase of data traffic, the interface between trunk communication equipment and access communication equipment is becoming faster. In the interface of trunk communication equipment that is connected to access communication equipment, strict polishing and shaping for each connection needs to be executed based on a contract with the user. This connection corresponds to a VC (virtual connection) for an ATM (asynchronous transfer mode) interface, and corresponds to an IP (Internet protocol) for a POS (packet over SONET) interface. A token bucket system is cited as typical polishing processing or shaping processing.

Figure 10:
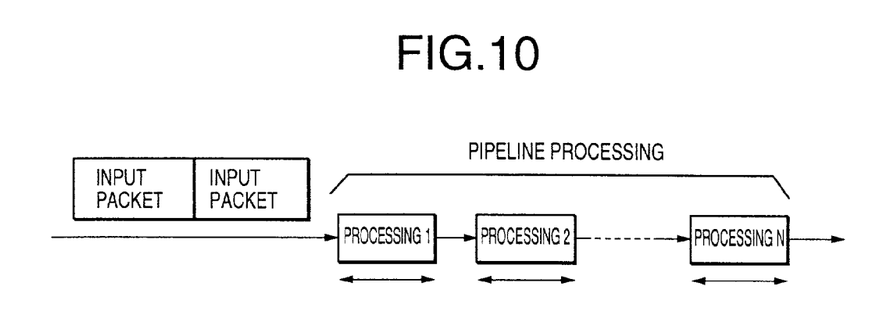
FIG. 10 is a drawing for describing piping processing.

Since this token bucket system requires the processing time of the algorithm, it is implemented by pipeline processing in conventional trunk communication equipment. The pipeline processing, as shown in FIG. 10, divides the algorithm of the token bucket system into a plurality of processing, and each processing is executed at a time for processing the minimum packet length T.

Figure 11:
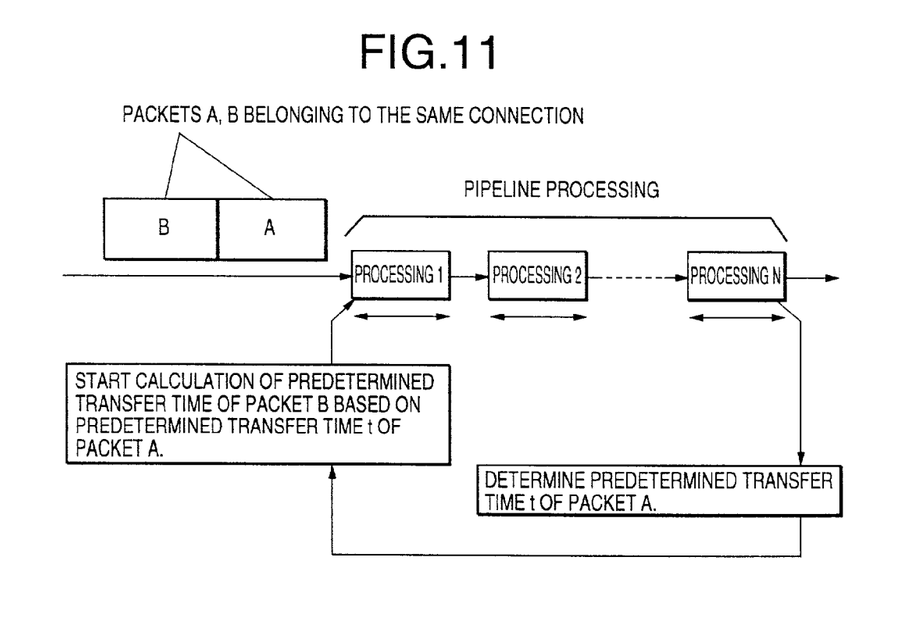
FIG. 11 is a drawing for describing shaping problems of the pipeline processing.

However, particularly in shaping processing, when the minimum packet that belongs to the same connection is continuously input, the following problem occurs. That is, for the shaping processing, in FIG. 11, when processing N terminates, a packet A of a connection in processing 1 is input and a predetermined transfer time of the packet A is determined. Accordingly, as shown in FIG. 11, the pipeline processing of a next packet B that belongs to the same connection is started after the processing N concerning the packet A terminates. Therefore, if the interval between the packet A and packet B is shorter than the time N×T until the processing 1 to N, the predetermined transfer time of each packet cannot be judged in real time. As a result, the shaping processing can be performed only for a connection of a comparatively low peak-rate such that the interval between the packet A and packet B exceeds N×T. As a result, it was difficult for a high-speed interface to shape the packet transfer for connection at a high peak-rate.

SUMMARY OF THE INVENTION

An object of the present invention is to improve the pipeline processing with regard to conventional shaping, and to provide a pipeline processing type shaping apparatus and its method in which strict shaping processing can also be achieved for a connection of various speed by adding a simplified circuit configuration.

According to the present invention, a pipeline processing type shaping apparatus is obtained that performs the pipeline processing by a pipeline processing portion concerning an input packet of a plurality of flows and shapes each of these flows, and calculates a predetermined scheduling time, including:

a storage means that manages and stores flow information being processed in the pipeline processing portion for each of the flows; and a calculating means that calculates the predetermined scheduling time, referring to the flow information regarding the flow of a packet input to the pipeline processing portion, and assuming that a virtual packet was input in which all packets that belong to the flow are connected.

And, according to the present invention, the calculating means includes:

a means that reads the flow information about the flow to which a packet belongs from the storage means in response to the input of this packet to the pipeline processing portion; and a means that calculates the predetermined scheduling time referring to this read information.

Further, the calculating means includes:

a storage information update means that updates flow information of the storage means for each of the flows in response to the input of the packet to the pipeline processing portion.

Further, the storage means includes:

internal registers that are equal to the number of processing blocks of the pipeline processing portion, wherein each of the internal registers stores the flow information of a packet that belongs to the same flow for which pipeline processing is being processed, and the flow information includes the sum total of the packet length.

According to the present invention, a pipeline processing type shaping method can be obtained that performs the pipeline processing by a pipeline processing portion concerning an input packet for a plurality of flows, shapes each of these flows, and calculates a predetermined scheduling time, including the steps of:

managing and storing flow information being processed in the pipeline processing portion for each of the flows; and calculating the predetermined scheduling time, referring to the flow information regarding the flow of the packet input to the pipeline processing portion, and assuming that a virtual packet was input in which all packets that belong to the flows are connected.

And, according to the present invention, the calculation step includes the steps of:

reading the flow information about the flow to which a packet belongs from the storage means in response to the input of this packet to the pipeline processing portion; and calculating the predetermined scheduling time referring to this read information.

Further, the calculation step includes the step of:

updating the flow information of the storage means for each of the flows in response to the input of the packet to the pipeline processing portion.

Further, the storage means includes:

internal registers that are equal to the number of processing blocks of the pipeline processing portion, wherein each of the internal registers stores the flow information of a packet that belongs to the same flow for which pipeline processing is being processed, and the flow information includes the sum total of the packet length.

According to the present invention, a recording medium can be obtained that records a control program of a pipeline processing type shaping method in which a predetermined scheduling time is calculated by performing pipeline processing by a pipeline processing portion concerning an input packet for a plurality of flows and shaping each of these flows, and the control program, including the steps of:

managing and storing flow information that is being processed in the pipeline processing portion for each of the flows; and calculating the predetermined scheduling time, referring to the flow information that corresponds to a flow of the packet input to the pipeline processing portion, and assuming that a virtual packet was input in which all packets that belong to the flow are connected.

The operation of the present invention is now described. A cache portion (storage means) that links with pipeline processing is provided. The flow information of a packet that is being processed in the pipeline processing portion is managed in this cache portion. When there are packets that belong to the same flow, the cache portion transfers a parameter to the pipeline processing portion assuming virtual packets in which all the packets are connected. The pipeline processing portion enables the predetermined scheduling time by shaping always to be calculated in real time for a flow at an optional peak-rate speed (reciprocal of the input packet interval that belongs to the same flow) and in any high-speed transmission path interface by executing the pipeline processing based on this virtual parameter.

BRIEF DESCRIPTION OF THE DRAWINGS

FIG. 5 (A) is a configuration diagram showing the field configuration of a management memory;

FIG. 5 (B) is a field configuration diagram of an internal register;

FIG. 5 (C) is a configuration diagram showing the field configuration of a predetermined scheduling time memory;

DESCRIPTION OF PREFERRED EMBODIMENTS

Figure 1:
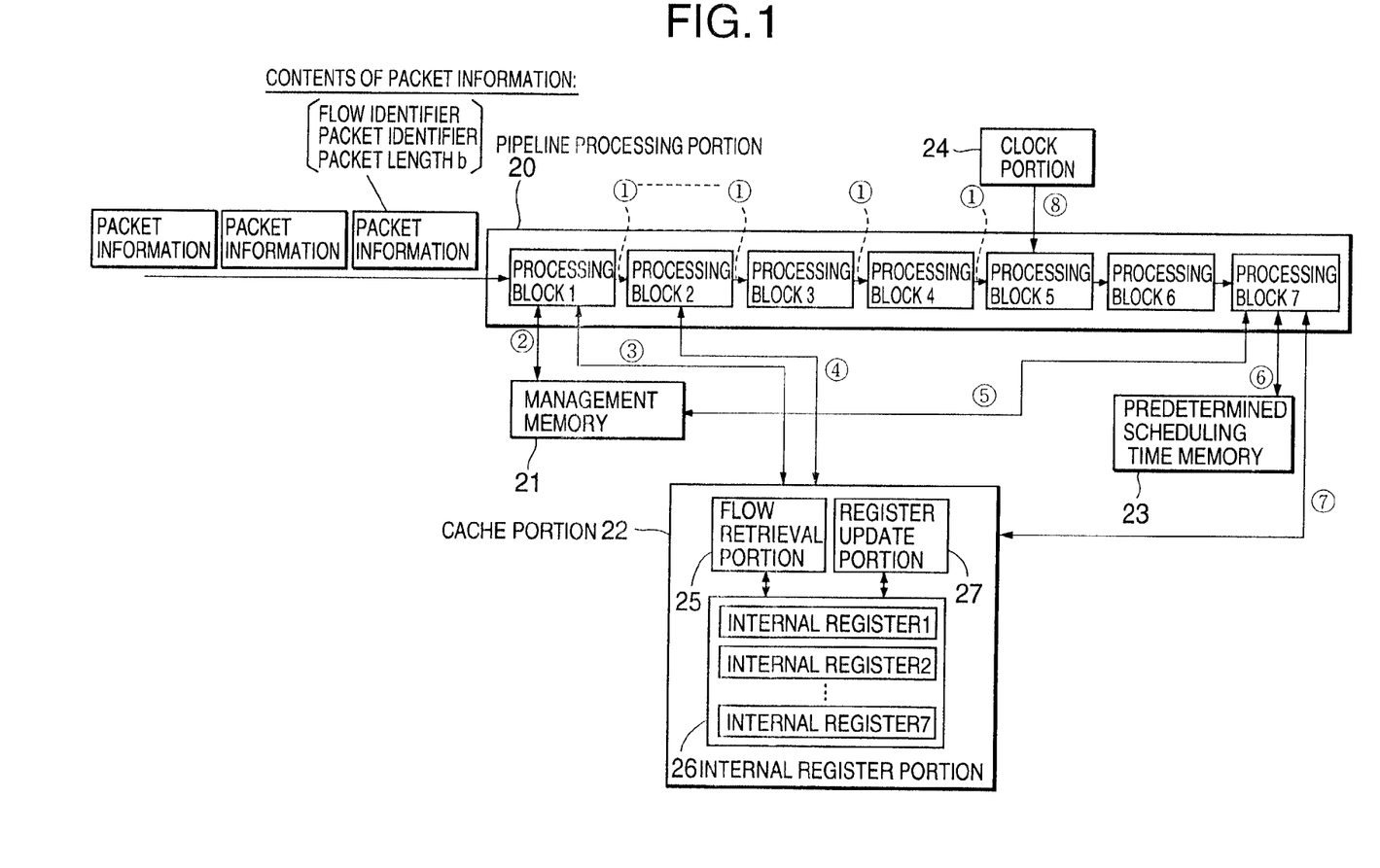
FIG. 1 is a block diagram of the example of the present invention.
Figure 2:
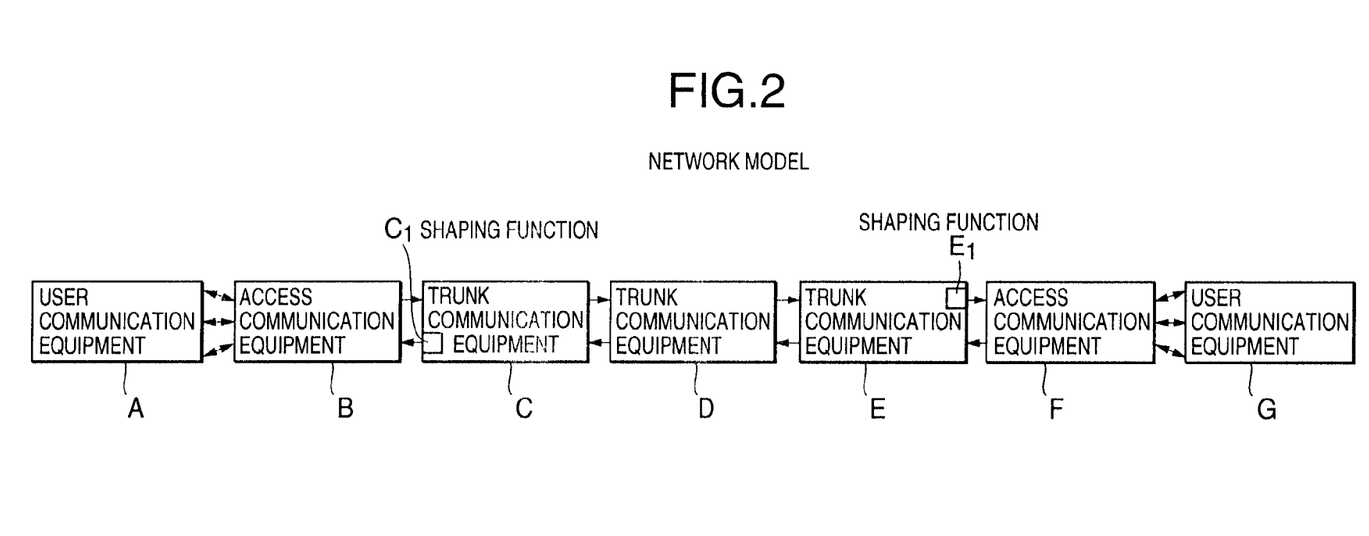
FIG. 2 is a drawing showing the system layout position of a shaping function according to the present invention.

The examples of the present invention are described with reference to the drawings. FIG. 1 shows the entire configuration of a shaping judgment portion that performs a scheduling function, as one example of the present invention. FIG. 2 shows the position where the object shaping function of the present invention is arranged inside a network. As shown in FIG. 2, the network comprises user communication equipment A, G, access communication equipment B, F, and trunk communication equipment C, D, E that form a backbone network. Access communication equipment is connected to user communication equipment, and bundles user traffic, and then sends them to trunk communication equipment. The traffic arrives at the access communication equipment of a remote station via a plurality of trunk communication equipment, and is subsequently transferred to the user communication equipment.

An IP flow or an ATM cell is assumed as the type of traffic. The shaping function described in the present invention is implemented for the traffic transferred from trunk communication equipment to access communication equipment or the traffic transferred from the access communication equipment to user communication equipment. Specifically, the shaping function transfers the traffic to a transmission path after it has been scheduled so that the average speed and peak speed specified in each IP flow and ATM connection can be maintained for a packet that belongs to the individual IP flow and ATM connection, and the shaping function is usually processing that determines what time the traffic is to be transferred in units of packet.

Figure 3:
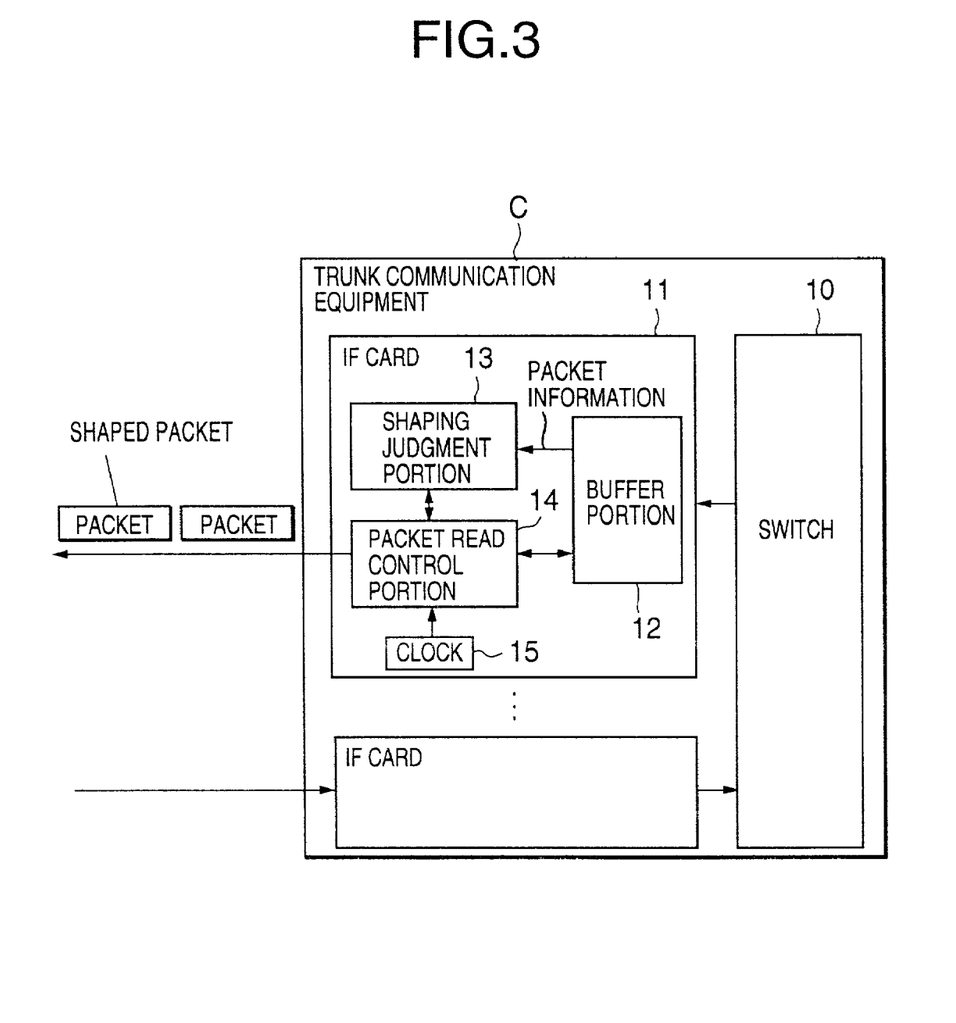
FIG. 3 is a drawing showing the configuration of trunk communication equipment and the position relation of a shaping judgment portion.

FIG. 3 also shows the applicable position of the shaping function of the present invention in trunk communication equipment (for example, (C) of FIG. 2). The circuit of the present invention shown in FIG. 1 corresponds to a shaping judgment portion 13 of FIG. 3. In the first place, the trunk communication equipment comprises a switch 10 and an IF card 11. A packet input via an IF card is switched to an appropriate output port, and the IF card that corresponds to the output port performs a plurality of processing including the shaping function and transfers the packet to a transmission path.

FIG. 3 shows only a block concerning a shaping function. The packet transferred from a switch is first stored in a buffer portion 12 of the IF card 11 shown in FIG. 3. The buffer portion 12 transfers each packet control information to the shaping judgment portion 13 as packet information. The shaping judgment portion 13 calculates a scheduling time to be transferred every packet based on the packet information and stores it in an internal predetermined scheduling time memory.

A packet read control portion 14 of the IF card 11 shown in FIG. 3 always compares the time of a clock 15 and the contents of the predetermined scheduling time memory. If a packet having the same predetermined scheduling time as the current time is registered, the packet is read from the buffer portion 12 and transferred to a transmission path.

Then, returning to the block diagram of FIG. 1, the example of the present invention, in the shaping processing implemented by the trunk communication equipment that is connected to access communication equipment, comprises a pipeline processing portion 20 consisting of a plurality of processing blocks, a cache portion 22 that operates in cooperation with processing blocks 1 to 7 of this pipeline processing portion, a predetermined scheduling time memory 23 that stores a predetermined scheduling time of a packet, a management memory 21 that manages information about the flow to which each packet belongs, and a clock portion 24 that is annexed to the pipeline processing portion 20.

The cache portion 22 is provided with an internal register portion 26, a flow retrieval portion 25, and a register update portion 27. The internal register portion 26 is provided with internal registers (each of the registers is marked 1 to 7 for clarity) of the same number as the number of processing blocks 1 to 7 in the pipeline processing portion 20.

Figure 4:
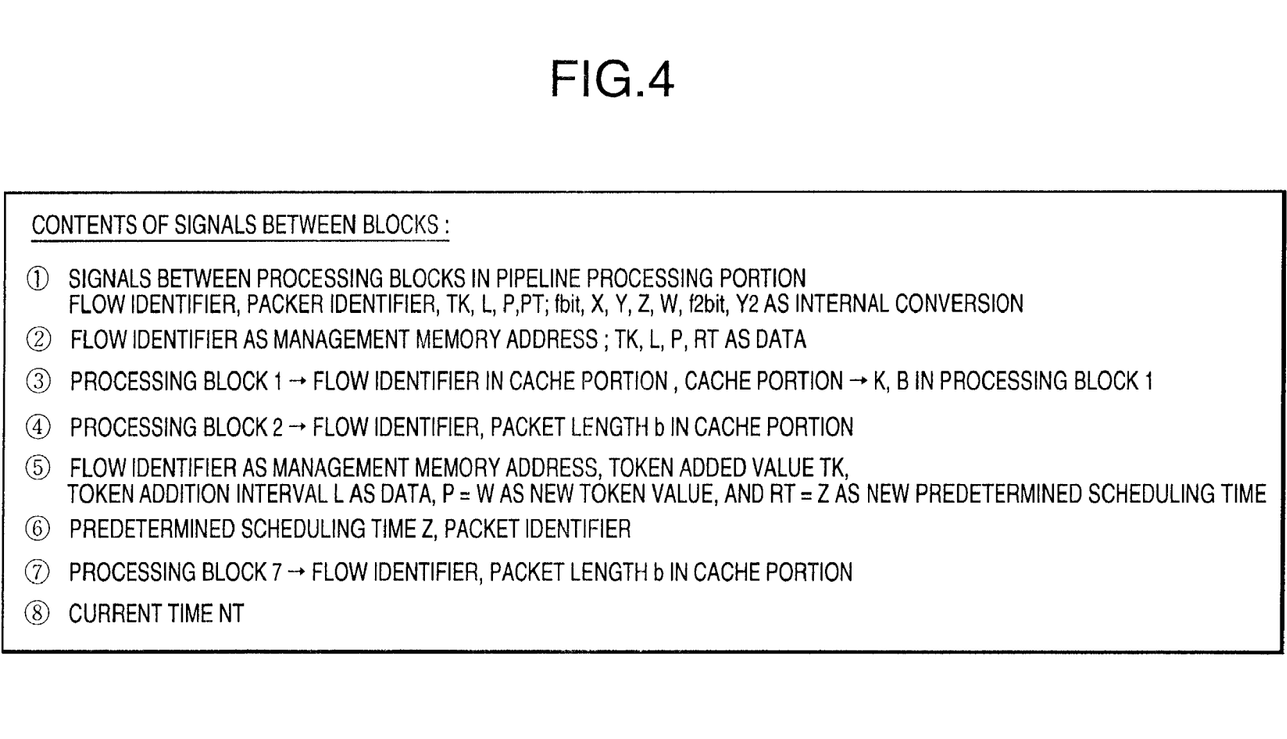
FIG. 4 is a drawing showing the contents of the inter-block signal of FIG. 1.
Figure 5A:
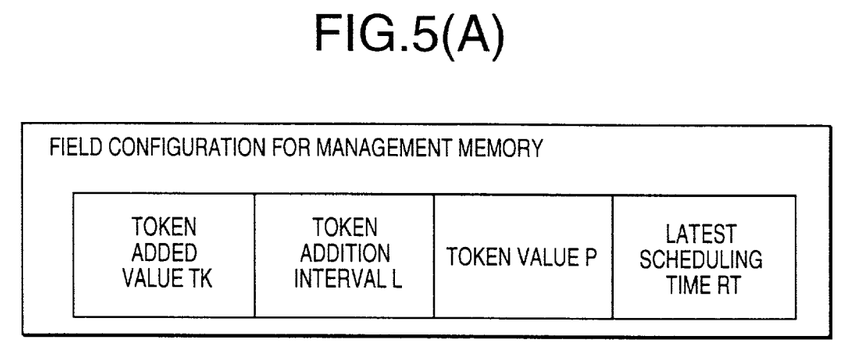
Figure 5B:
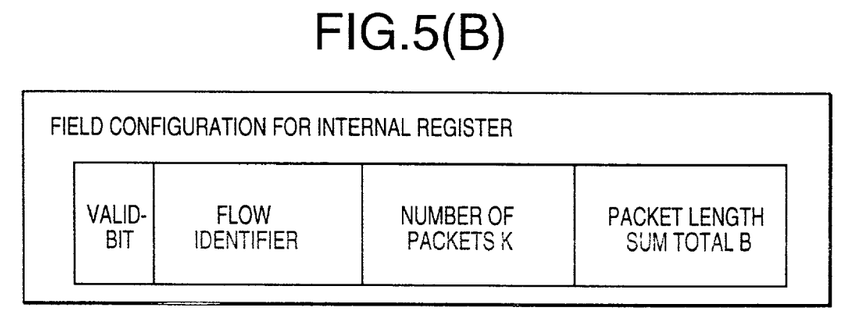
Figure 5C:
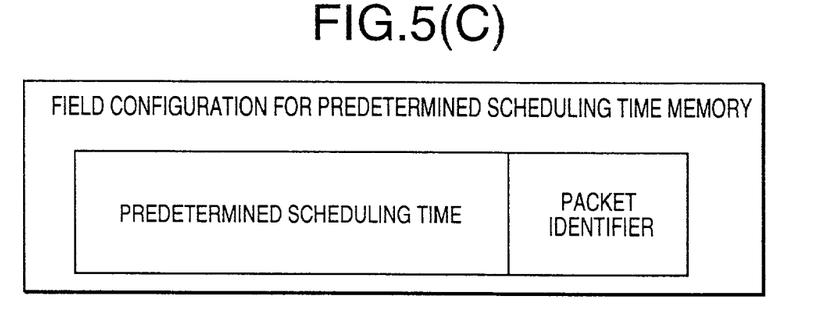

FIG. 4 is used to describe the contents 1 to 7 of the signal between blocks in the block diagram of FIG. 1. FIG. 5 (A) shows the contents of the management memory 21, (B) shows the contents of the internal register of the cache portion 22, and (C) shows the contents of the predetermined scheduling time memory 23, respectively. FIGS. 4 and 5 are described later.

Figure 6:
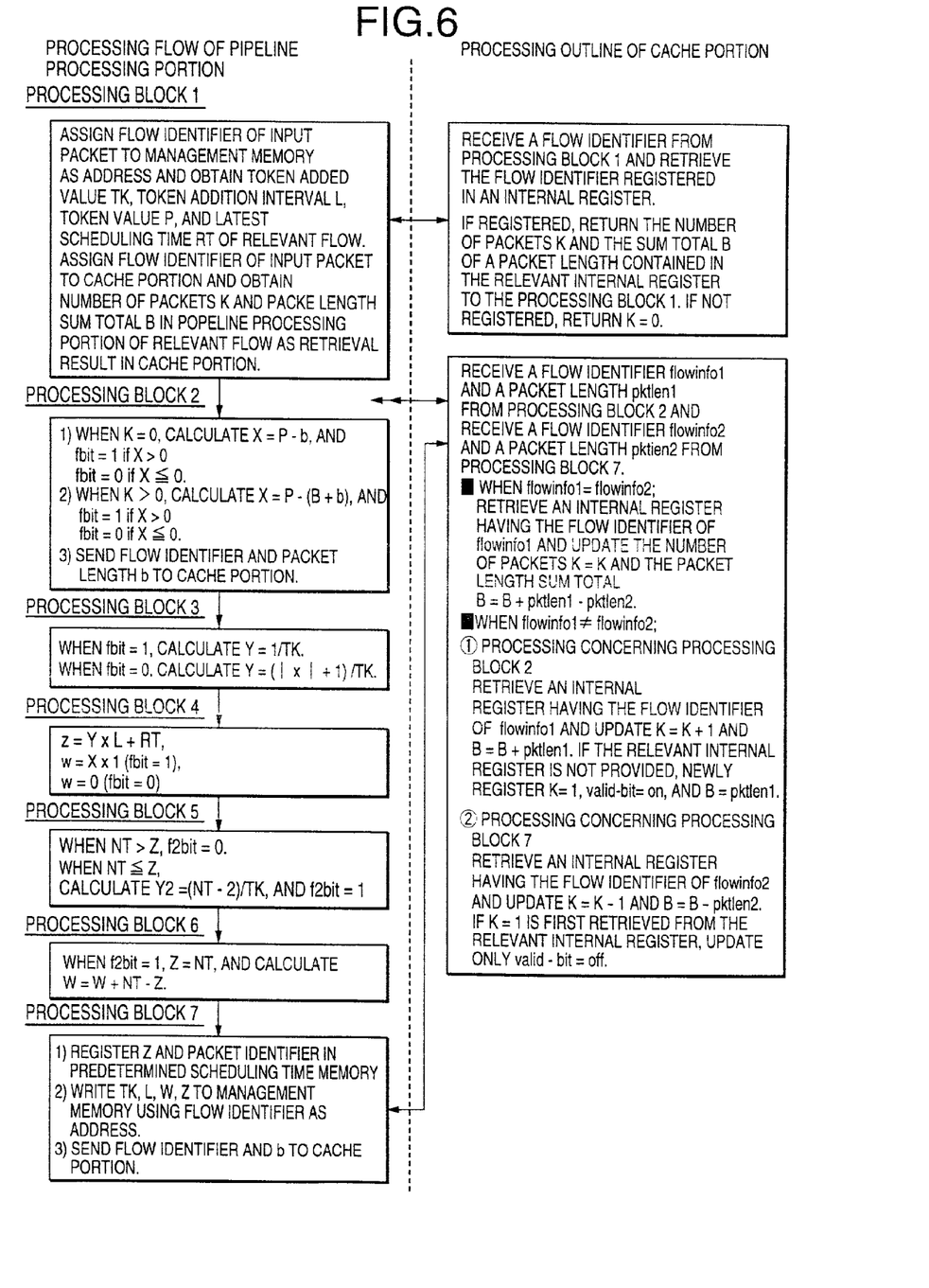
FIG. 6 is a processing flow of a pipeline processing portion and a cache portion.

In the pipeline processing portion 20, the processing blocks 1 to 7 execute the algorithm shown in FIG. 6. Moreover, following pipeline processing, the cache portion 22 of FIG. 1 operates based on the processing algorithm of FIG. 6.

As shown in FIG. 1, the cache portion 22 comprises the internal register portion 26, the flow retrieval portion 25, and the register update portion 27, and the internal register portion 26 holds flow information about a packet that is being processed in the processing blocks 1 to 7 of the pipeline processing portion 20.

The configuration of the management memory 21, as shown in FIG. 5 (A), has information about a "token added value", a "token addition interval", a "token value", and the "latest scheduling time " using a flow identifier as an address. Further, the internal register of the cache portion 22, as shown in FIG. 5 (B), consists of a "valid-bit" indicating whether a register is empty or not, a "flow identifier", the "number of packets" indicating the number of packets that belong to a flow in a pipeline processing portion, and a "packet length sum total" that is the sum total of the length of the relevant packet. Besides, the "number of packets" is a value specified only for a flow that exists in the pipeline processing portion 20 (pipeline processing is being performed), and the cache portion 22 does not need to manage all flows.

The respective processing blocks 1 to 7 of the pipeline processing portion 20 perform the operation shown in the processing algorithm of FIG. 6 concerning an input packet in terms of a pipeline. Each of the processing blocks 1 to 7 calculates a predetermined scheduling time when transfer can next be performed based on the latest scheduling time of the previous packet of the same flow obtained from a management memory if there is no packet that belongs to the same flow as the packet that its own processing block is processing in a processing block at a stage further to the rear than its own stage. In the processing block at a stage further to the rear than its own stage, when there are packets that belong to the same flow as the packet that its own block is processing, the processing blocks assume a virtual packet in which their packets and its own packet are connected and calculate a scheduling time at which the packet can be transferred.

Thus, compared with a conventional shaping method constituted by only a pipeline processing portion, a cache portion that links with pipeline processing is provided, and the cache portion manages the flow information about the packet that is being processed in the pipeline processing portion. When there is a packet that belongs to the same flow, the cache portion transfers a parameter to the pipeline processing portion assuming a virtual packet in which all the packets are connected, and the pipeline processing portion executes the pipeline processing based on the virtual parameter. Consequently, the predetermined scheduling time can also always be calculated in real time by shaping processing for a flow at an optional peak-rate speed (reciprocal of the input packet interval that belongs to the same flow) and in any high-speed transmission path interface.

Packet information is transferred from the buffer portion 12 to the shaping judgment portion 13 of FIG. 3. This packet information is input to the processing block 1 of the pipeline processing portion 20 of FIG. 1. The processing block 1 accesses the management memory 21 based on a flow identifier in the packet information, and obtains operation parameters (token added value TK, token addition interval L, token value P, and the latest scheduling time RT) for pipeline operation processing that are the flow information of the relevant packet. Further, the processing block 1 reports a flow identifier to the cache portion 22.

The cache portion 22, as shown in FIG. 6, based on a flow identifier, retrieves whether the information about the relevant flow identifier is registered in an internal register or not by the operation of the internal flow retrieval portion 25 and the internal register portion 26. If the information is registered, registered information such as the number of packets and packet length sum total is reported to the processing block The processing block 2 performs the processing specified in FIG. 6 based on the flow information obtained from the processing block 1 and the flow information obtained from the cache portion 22. Further, a flow identifier and its own packet length b are resent to a cache portion. At the same time, the result operated in the processing block 2 is transferred to the processing block 3.

The processing block 3 executes the processing algorithm shown in FIG. 6 based on the information transferred from the processing block 2 and transfers the result to the processing block 4. The processing block 4 executes the processing algorithm shown in FIG. 6 based on the information transferred from the processing block 3 and transfers the result to the processing block 5.

The processing block 5 executes the processing algorithm shown in FIG. 6 based on the information transferred from the processing block 4 and the current time NT transferred from a clock portion and transfers the result to the processing block 6. The processing block 6 executes the processing algorithm shown in FIG. 6 based on the information transferred from the processing block 5 and transfers the result to the processing block 7. The processing block 7 executes the processing algorithm shown in FIG. 6 based on the information transferred from the processing block 6 and transfers the result to the management memory 21, the predetermined scheduling time memory 23, and the cache portion 22.

Figure 7:
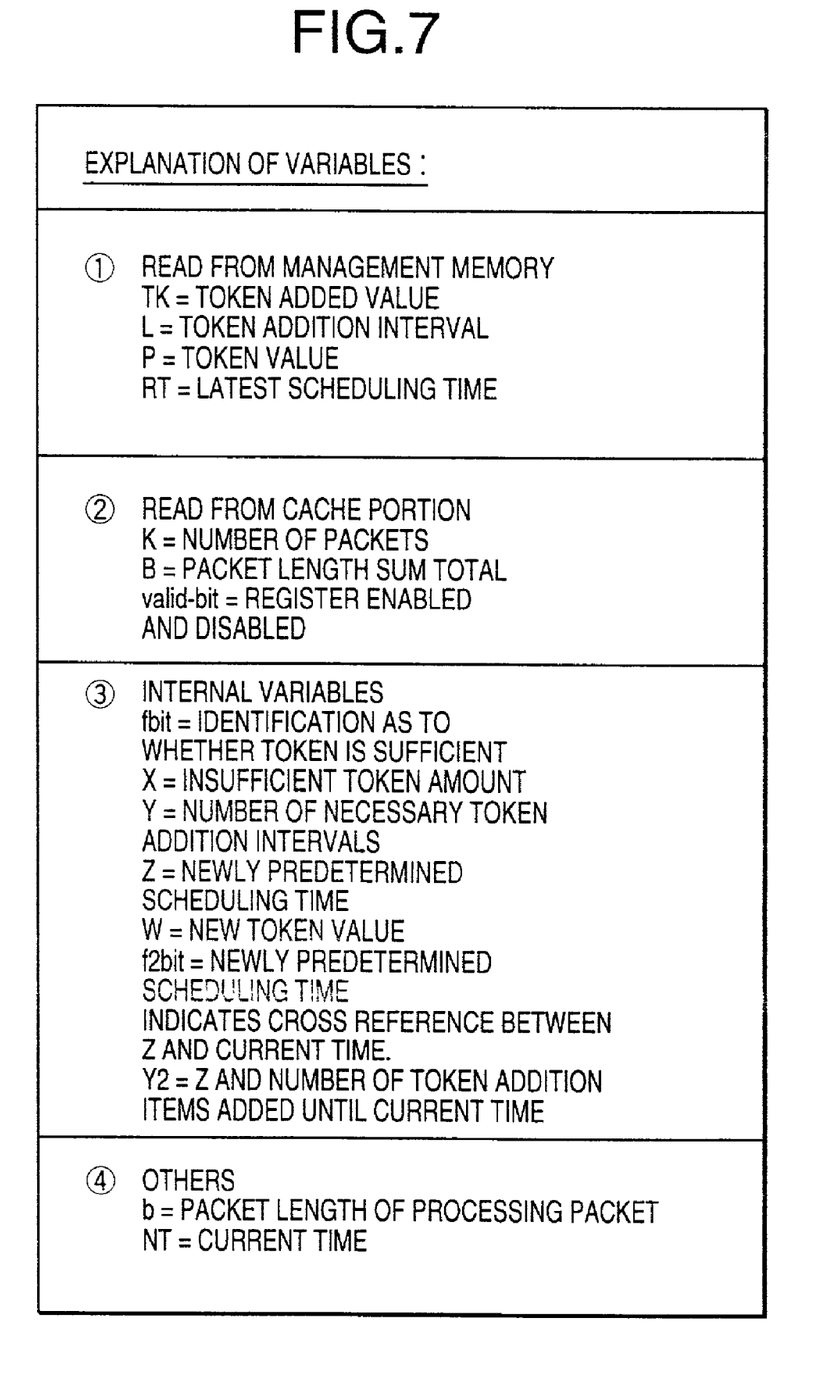
FIG. 7 is a drawing for describing a variable (parameter) in the processing flow of FIG. 6.

Specifically, the management memory 21 is accessed using a flow identifier as an address, and a token added value, a token addition interval, a token value, and the latest scheduling time are updated. Further, a predetermined scheduling time and a packet identifier are registered in the predetermined scheduling time memory 23. Then a flow identifier and the packet length b are sent to the cache portion 22 to change the contents of an internal register. The clock portion 24 always reports the current time NT to the processing block 5. Besides, FIG. 7 shows a drawing that describes the variables (parameters) used in the algorithm shown in FIG. 6.

Figure 8:
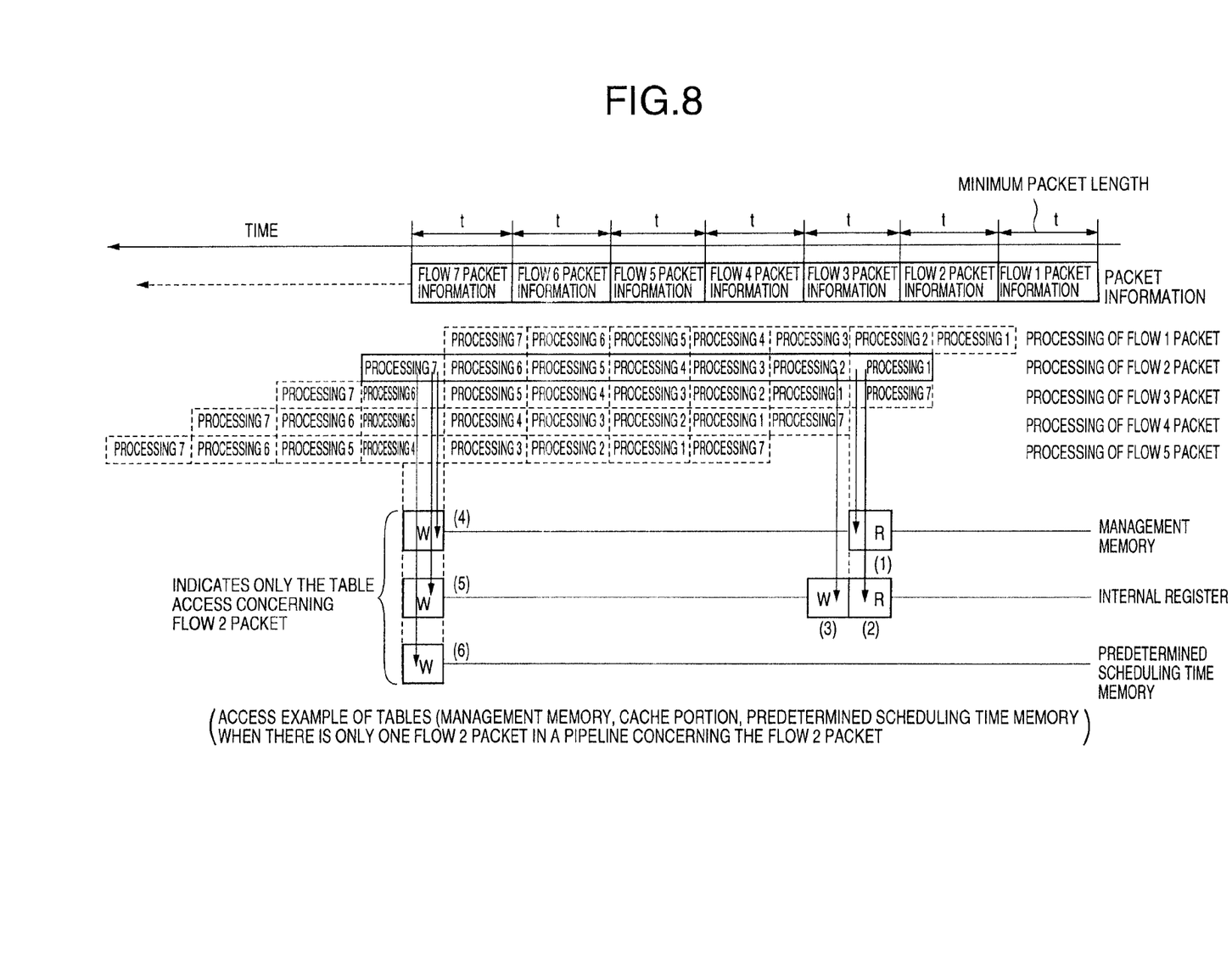
FIG. 8 is one example of timing showing the operation of an example of the present invention.
Figure 9:
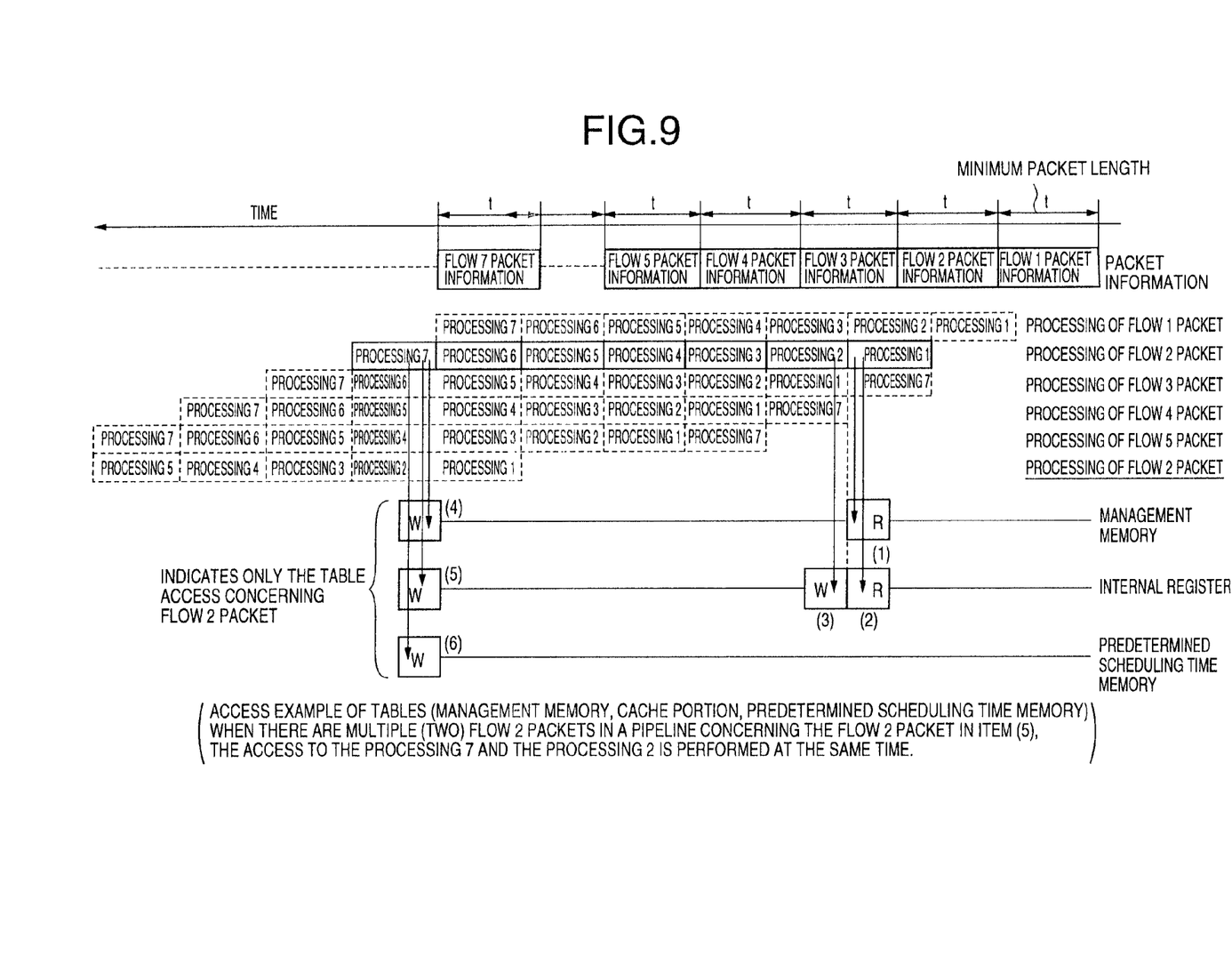
FIG. 9 is another example of timing showing the operation of an example of the present invention.

The cache portion 22 receives a flow identifier and the packet length b from the processing block 2 and receives a flow identifier and the packet length b from the processing block 7. The cache portion updates the contents of an internal register by the mutual processing of the flow retrieval portion 25, the register update portion 27, and the internal register portion 26 based on the processing algorithm shown in FIG. 6. As the timing of the processing described above, an example of access to processing timing when a plurality of packets that belong to the flow 2 are not provided in a pipeline is shown in FIG. 8, and an example of access to processing timing when a plurality of packets that belong to the flow 2 are provided in a pipeline is shown in FIG. 9.

The operation of this example is described below. First, the location to which a pipeline type shaping circuit with a cache applies is described. As shown in FIG. 2, a network comprises user communication equipment A, G, access communication equipment B, F, and trunk communication equipment C, D, E, and the communication between the user equipment A and G is performed via the access communication equipment B, trunk communication equipment C, trunk communication equipment D, trunk communication equipment E, and access communication equipment F. Particularly, in the location between trunk communication equipment and access communication equipment or between access communication equipment and user communication equipment, shaping processing is performed in units of flow between the user equipment. This shaping function is shown by the shaded portion in FIG. 2.

Next, an outline of the trunk communication equipment C is shown in FIG. 3. The trunk communication equipment comprises a plurality of the IF cards 11 and the switch 10. The packet or cell input from a transmission path to an IF card is transferred to the IF card that is connected to the transmission path to be output after it is switched and processed by the switch 10. The processing of the shaping function in the sending direction of a transmission path from the switch 10 is realized by the combination of the buffer portion 12 in the IF card, the shaping judgment portion 13, the packet read control portion 14, and the clock 15, as shown in FIG. 3.

The packet or cell transferred from the switch 10 is first stored in the buffer portion 12. Simultaneously when it is stored, the buffer portion 12 reports the information about the relevant packet to the shaping judgment portion 13 as packet information. The shaping judgment portion 13 calculates a predetermined scheduling time for the transmission path of each packet based on a flow identifier that specifies inter-user communication and registers it in an internal predetermined scheduling time memory.

On the other hand, the packet read control portion 14 receives notification of the current time from the clock portion 15, and inquires the predetermined scheduling time memory of the shaping judgment portion as to whether a packet that is scheduled to be transferred at the current time exists in the buffer portion 12. If the relevant packet is registered, the packet is read from the buffer portion and is transferred to a transmission path. The operation described above realizes the shaping function every flow (specified with a flow identifier) between each user communication equipment.

Besides, in the predetermined scheduling time memory 23, when a plurality of flow packets are registered at the same hour, the packet read control portion 14 needs to select only one packet from these plurality of packets and read it. However, the present invention does not relate to implementation of such function, but relates to the processing of determining a predetermined scheduling time in the shaping judgment portion 13 and registering it in the predetermined scheduling time memory 23, so only this part is described. Particularly, in an IF card that terminates a high-speed line exceeding OC-48 (2.4 Gbps) and OC-192 (10 Gbps), the present invention can determine an accurate predetermined scheduling time against optional shaping parameters (peak speed and average speed).

An example of the present invention is described below. As shown in FIG. 1, the shaping judgment portion 13 comprises the pipeline processing portion 20, the management memory 21, the cache portion 22, the predetermined scheduling time memory 23, and the clock portion 24. Packet information is transferred from the buffer portion 12 of FIG. 3 to a pipeline processing portion. The contents of packet information consist of three items: a flow identifier, a packet identifier, and the packet length b.

The flow identifier indicates a flow between user equipment to which the relevant packet belongs, and is previously assigned to the input of the shaping judgment portion 13. The packet identifier specifies a packet that stays in the buffer portion 12 of FIG. 3, and is previously assigned to the input of the shaping judgment portion 13. The packet length b indicates the length of the relevant packet.

The pipeline processing portion 20 comprises the processing blocks 1 to 7, as shown in FIG. 1. Fixed processing is specified for the processing blocks 1 to 7, and each processing block receives a processing result from the processing block at the preceding stage and performs the specified processing assigned to its own block, and then the result is transferred to the next processing block. The processing of each block is described in FIG. 6. FIGS. 8 and 9 indicate the timing of a processing block, and processing 1 to 7 indicate the processing timing of the processing blocks 1 to 7, respectively. After the processing 1 to 7 are executed, the predetermined scheduling time of a packet is determined.

The information transferred between processing blocks, as shown in 1 of FIG. 1, consists of a flow identifier, a packet identifier, and the packet length b from packet information, a token added value TK, a token addition interval L, a token value P and the latest scheduling time RT read from the management memory 21, and internal variables fbit, X, Y, Z, W, f2bit, Y2. These pieces of information are shown in FIG. 7 and are necessary parameters when each processing block autonomously performs processing, and are transferred from the processing block 1 to the processing block 7 via a processing block every input packet.

A flow identifier is assigned from the processing block 1 or processing block 7 to the management memory 21 as an address. As data, there are a token added value TK and a token addition interval L that are specified at system startup and are shaping parameters. Further, as values that change dynamically, there are a token value P and the latest scheduling time RT. The contents of a management memory are read in the processing block 1 and only the P and RT are updated in the processing block 7 (access to 1 and 5 of FIG. 1).

A predetermined scheduling time comprises a CAM (content addressable memory), and registers a packet identifier and its predetermined scheduling time. The packet read control portion 14 of FIG. 3 retrieves the presence of registration of a predetermined scheduling time that matches the current time from the predetermined scheduling time memory 23, and reads a packet from the buffer portion 12 based on the packet identifier when the registration is provided.

The cache portion 22 comprises the flow retrieval portion 25, the register update portion 27, and the internal register portion 26. The cache portion 22 manages the flow information of a packet that is being processed in each processing block of the pipeline processing portion 20. Specifically, the flow information of the packet that is being processed in each processing block of the pipeline processing portion 20 is stored in each internal register of the internal register portion 26. The number of flows that are being processed in a pipeline processing portion is maximized when each processing block processes packets each having different flows. Accordingly, it is desirable that internal registers of an internal register portion be prepared only for the number of processing blocks.

An internal register, as shown in FIG. 5 (B), consists of a valid-bit indicating whether this register is valid or not, a flow identifier that specifies a flow, the number of packets K (in a packet that is being processed in a pipeline processing portion) that belong to the flow, and the sum total B of the packet length of packets that belong to the flow.

The clock portion 24 manages the current time, and always reports the current time NT to the processing block 5. Besides, the time NT of this clock portion is assumed to be faster than the time of the clock on the IF card 11 of FIG. 3 only for time $\tau$ that depends on the delay of pipeline processing. The processing flow of each processing block is shown in FIG. 6.

The details are described below. First, packet information is input to the processing block 1 of a pipeline processing portion. The processing block 1 accesses the management memory 21 based on the flow identifier of the packet information, and obtains the flow information (token added value TK, token addition interval L, token value P, and latest scheduling time RT) of the relevant packet (access to 2 of FIG. 1). The processing block 1 further reports the flow identifier to the cache portion 22. The flow retrieval portion 25 of the cache portion 22 retrieves from the internal register portion 26 whether the information about the relevant flow identifier is registered in an internal register based on the flow identifier. When the information is registered, the number of packets K that are registration information and the packet length sum total B are reported to the processing block 1 (access to 3 of FIG. 1).

The processing block 2 receives the information about the flow to which a packet belongs from the processing block 1 and the cache portion 22, and performs different processing in the processing blocks 2 to 7 depending on whether there is no packet that belongs to the same flow as its own packet or not. When there is no packet that belongs to the same flow as its own packet, a predetermined scheduling time by shaping is judged based on only the information read from the management memory 21 in the processing block 1.

When there is a packet that belongs to the same flow as its own packet, a predetermined scheduling time by shaping cannot be judged in the same manner. This is because the result concerning a flow that is being processed in the pipeline processing portion 20 is not reflected in the management memory 21. Therefore, the predetermined scheduling time is determined also including the packet information of the same flow contained in the processing blocks 3 to 7 at the rear stage. Specifically, the predetermined scheduling time is determined based on the current token value P, the latest scheduling time RT, and packet length="packet length b that is being processed in the processing block 2"+"sum total B of the packet length of the same flow contained in the processing blocks 3 to 7".

That is, a predetermined scheduling time is determined assuming that a large packet of packet length=b+B has been virtually input instead of the packet length b. As a result, the correct predetermined scheduling time is always determined, even when there is a packet that belongs to the same flow in a pipeline processing portion.

Further, when the transmission path speed of the IF card 11 increases and the packet information transfer time t of FIGS. 8 and 9 is shortened, the processing time t of each processing block can be shortened by dividing it into finer processing blocks 1 to N (N>8). As a result, a predetermined scheduling time can be judged correctly regardless of a high-speed interface.

The processing block 2 recognizes that a packet that belongs to the same flow as the packet of the processing block 2 does not exist in the processing block at the rear stage when the number of packets K obtained from a cache portion is 0. Accordingly, it is desirable that the time that a packet can be transferred following the latest predetermined scheduling time RT obtained from a management memory be determined in the processing block 1.

First, whether the current token value is sufficient to perform packet transfer is judged. The latest token value is P that is obtained from a management memory. Since the length of a packet that is being processed is b, the calculation of X=P-b is performed. Since the token value is sufficient if X>0, the packet can be transferred at the next time of RT. If $X \leq 0$, the predetermined scheduling time is delayed until a token is collected and X>0 is set. Further, if X>0, fbit=1 is set, and fbit=0 is set when $X \leq 0$ in order to report to the processing block at the rear stage that a packet can immediately be transferred at the next time of RT.

Further, in case the number of packets obtained from a cache portion is K>0, a packet having the same flow identifier in the processing block at the rear stage recognizes that there are K packets except its own packet. Since pipeline processing is not terminated, the predetermined transfer times of K packets are not determined. Accordingly, the latest predetermined scheduling time RT of a management memory is not the predetermined scheduling time of the preceding packet having the same flow identifier but the predetermined scheduling time of the packet before the K packets. Therefore, it is desirable that the time the (K+1)-th packet is transferred be determined starting from the predetermined scheduling time of the packet before the K packets.

First, to check the necessary token value, X=P−(B+b) is calculated instead of X=P−b. Since X indicates an insufficient token value for transferring the relevant packet, the token value is sufficient if X>0 and the packet can be transferred at the time following RT. If $X \leq 0$, a predetermined scheduling time must be delayed until a token is collected and X>0 is set. If X>0, fbit=1 is set to report to the processing block at the rear stage that a packet can immediately be transferred at the time following RT. When $X \leq 0$, fbit=0 is set.

Since the flow information in the pipeline processing portion is changed according to the packet that the processing block 2 is processing, a cache portion must change an internal register. Therefore, the processing block 2 transfers a flow identifier and the packet length b of a packet that is being processed to the cache portion.

The processing block 3 first calculates that how many times the token TK is added satisfies the requirement of X>0 in order to determine a predetermined scheduling time of a packet and a new token value in this predetermined scheduling time based on fbit and X reported from the processing block 2. This count that can be added is Y.

The processing block 3 calculates Y=(|X|+1)/TK (|X|indicates the absolute value of X) to identify how many times the token amount TK needs to be added until X>0 is set, since $X \leq 0$ for fbit=0. Further, when fbit=1, since it has already been determined that a predetermined scheduling time is the next time RT+1 of RT, Y=(RT+1−RT)/TK=1/TK is calculated.

Y described above indicates that a token value P exceeds 0 at the time at which the Y-times token addition interval time L elapsed in the latest predetermined scheduling time RT when X<0 concerning the packet of the relevant flow identifier.

The processing block 4 determines a predetermined scheduling time of the relevant packet and the token value at that time based on Y. The predetermined scheduling time can be obtained from Z=Y×L+RT according to the definition of Y. Further, the token value is set to W=|X|+1 (equal to W=Y×TK+X) when fbit=1 (equal when X>0), and is set to W=1 (equal to W=Y×TK+X) when fbit=0 (equal when X≦0).

The processing block 5 corrects the predetermined scheduling time Z obtained in the processing block 4 and the token value W. Further, the processing block 5 obtains the current time NT from a clock portion. If Z is a time later than the current time NT, Z and W do not need to be corrected. To report to the processing block at the rear stage that no correction processing is necessary, f2bit=0 is set.

However, when NT>Z, since a predetermined scheduling time is already a time in the past, the scheduling time Z is corrected to NT and W must also be corrected together. Therefore, the operation of Y2=(NT−Z)/TK is newly performed. Further, to report to the processing block at the rear stage that correction processing is necessary, f2bit=1 is set. When NT≦Z, f2bit 0 is set.

The processing block 6 advances correction processing following the processing block 5 when f2bit=1. Z=NT is set as a new predetermined scheduling time. Further, as a token value, W=W+NT−Z is set. No processing is performed when f2bit=0.

The processing block 7 updates each table based on the result obtained in the processing block 6. First, Z and a packet identifier are registered in a predetermined scheduling time memory. Further, a management memory is accessed using a flow identifier as an address and values of TK, L, W, and Z are newly written.

Besides, as shown in FIGS. 8 and 9, by specifying each timing at the first half and the latter half of each processing time so that the read phase (R) and write phase (W) of a management memory will not overlap, the processing block 1 and the processing block 7 that access the management memory will not cause an access contention. Further, since a packet that is being processed in the processing block 7 is read from a pipeline processing portion, the information about the internal register of a cache portion needs to be updated. Therefore, a flow identifier and the packet length b are reported to the cache portion.

A cache portion manages a flow that belongs to a packet which is being processed in a pipeline processing portion synchronizing with a processing block of the pipeline processing portion. The cache portion comprises an internal register portion, a flow retrieval portion, and an internal register portion. The internal register portion has a plurality of internal registers, and the number of these internal registers is equal to the number of processing blocks in the pipeline processing portion.

Only the flow information about a packet that is being processed in a processing block of a pipeline processing portion is stored in an internal register. The internal register comprises four fields, as shown in FIG. 5 (B). The first field is a valid-bit. The valid-bit indicates whether the internal register is being used or not. When the valid-bit is on, a flow identifier is registered. When the valid-bit is off, nothing is registered and the internal register is empty.

The second field is a flow identifier field. A flow identifier that is transferred following a packet is registered in the flow identifier field. The third field is the number of packets K. The number of packets K indicate show many packets that belong to the second flow identifier exist in a pipeline processing portion. The fourth field is the sum total B of a packet length. The sum total B of the packet length is the sum total of all the packets of the flow of a flow identifier that exists in the pipeline processing portion.

The flow retrieval portion 25 searches a register concerning a specific flow identifier in an internal register. The internal register update portion 27 updates each internal register. Further, it performs operation (addition of K=K +1 or subtraction of K=K−1) for the number of packets field held in each register and operation (B=B+b or B=B−b) for the packet length sum total.

First, when a cache portion receives a flow identifier from the processing block 1, the flow retrieval portion 25 retrieves an entry that matches the flow identifier and in which a valid-bit is set on in an internal register of the internal register portion 26. If a matching entry can be retrieved, the contents (the number of packets K and the sum total B of a packet length) of the internal register of the relevant entry are read and the number of packets K and the sum total B of the packet length are returned to the processing block 2. If no matching entry can be found, the contents are returned to the processing block 2 as the number of packets K=0.

Further, the cache portion 22 receives a flow identifier and the packet length b from the processing block 2 and performs additional processing of packet information based on the information. Then the cache portion receives a flow identifier and the packet length b from the processing block 7 and performs delete processing of packet information based on this information. If the flow identifier from the processing block 2 is specified as flowinfo1 and the packet length is specified as pktlen1 and the flow identifier from the processing block 7 is specified as flowinfo2 and the packet length is specified as pktlen2, the processing is performed based on the following rules.

When flowinfo1=flowinfo2, the flow information of flowinfo1 already exists in an internal register, and due to the packet addition according to the notification from the processing block 2 and the packet deletion from the processing block 7, the number of packets K of an internal register will not be changed. The sum total B of a packet length needs to reflect the packet length addition from the processing block 2 and the packet length deletion from the processing block 7.

First, a flow retrieval portion retrieves an entry in which flowinfo1 and a flow identifier match and a valid-bit is set on in an internal register of an internal register portion. The sum total B=B+pktlen1−pktlen2 of a packet length is calculated for this entry and the contents of the register in the entry are updated.

When flowinfo1≠flowinfo2, the additional processing of the flow information according to the notification from the processing block 2 and the delete processing of the flow information according to the notification from the processing block 7 are performed at the same time. First, the additional processing of the flow information according to the notification from the processing block 2 is described. A flow retrieval portion retrieves an entry in which flowinfo1 and a flow identifier match and a valid-bit is set on. Then a register update portion performs operation of the number of packets K= K+1 and the sum total B=B+pktlen1 of a packet length to this entry and changes the contents of a register.

If there is no entry in which flowinfo1 and a flow identifier match and a valid-bit is set on, an empty entry in which the valid-bit is set off is retrieved to newly register the flow information about flowinfo1 and pktlen1. A flow identifier, the number of packets K=1, and the sum total of a packet length B=pktlen1 are registered in this entry.

When flowinfo1≠flowinfo2, the additional processing of flow information according to the notification from the processing block 2 and the delete processing of flow information according to the notification from the processing block 7 are performed at the same time. First, the additional processing of the flow information according to the notification from the processing block 2 is described.

The flow retrieval portion 25 retrieves an entry in which flowinfo1 and a flow identifier match and a valid-bit is set on. Then, a register update portion performs operation of the number of packets K=K+1 and the sum total B=B+pktlen1 of a packet length to this entry and changes the contents of a register. If there is no entry in which flowinfo1 and a flow identifier match and a valid-bit is set on, an empty entry in which the valid-bit is set off is retrieved to newly register the flow information of flowinfo1 and pktlen1. A flow identifier, the number of packets K=1, and the sum total B=pktlen1 of a packet length are registered in this entry.

Next, the delete processing of flow information according to the notification from the processing block 7 is described. A flow retrieval portion retrieves an entry in which flowinfo2 and a flow identifier match and a valid-bit is set on. Then a register update portion performs operation of the number of packets K=K−1 and the sum total B=B−pktlen2 of a packet length to this entry and updates the contents of a register. However, in case of the original number of packets K=1, it indicates that a packet that belongs to a flow of flowinfo2 is lost from a pipeline processing portion, so it is desirable that the valid-bit be set off. Since the processing according to the notification from the processing block 7 is the update of flow information that already exists in an internal register, the case in which there is no entry in the processing of the flow retrieval portion need not be considered.

The processing described above is the registration or update processing concerning an internal register of the limited number of flows (the maximum number of processing blocks in a pipeline processing portion). The real-time processing can easily be achieved by optimizing and designing the entirety of the cache portion using a combinatorial circuit. The processing block and the processing timing of the cache portion are shown in FIGS. 8 and 9.

FIG. 8 shows the processing timing when there is only one packet that belongs to the same flow in a pipeline. As packet information, flow 1, flow 2, flow 3, flow 4, flow 5, flow 6, and flow 7 are continuous. However, since the number of pipeline stages to be processed is seven stages of processing 1 to processing 7, each processing block processes a packet of each different flow. As shown in FIG. 8, concerning a management memory, since a read phase (1) and a write phase (4) are clearly separated at the first half and latter half of a processing cycle, no access contention will occur.

Similarly, since a predetermined scheduling time memory is also specified only at the first half (6) of a processing cycle, no access contention will occur. For an internal register, a read phase (first half (2) of the processing cycle) and a write phase (latter half (3) or (5) of the processing cycle) are clearly separated. However, in the write phase, since the processing block 2 and the processing block 7 simultaneously perform write access respectively, an access contention will occur. Even in this case, as described already, since the number of internal registers is limited to the number of processing blocks (seven in the drawing) of a pipeline processing portion, the access processing of the internal register is optimized and constituted using a combinatorial circuit, thereby enabling processing unlike a normal memory.

Besides, FIG. 8 shows only access to the input of a packet of flow 2. In practice, since the processing block 1 to 7 always operate on the packet of each flow, accesses to a management memory, an internal register, and a predetermined scheduling time memory always occur every processing cycle.

FIG. 9 shows an example of processing timing when there are multiple packets that belong to the same flow in a pipeline unlike the example of FIG. 8. In FIG. 9, two packets of flow 2 shown in the shaded portion exist in the pipeline at the same time. As shown in (5) of FIG. 9, particularly in the write processing of an internal register, concerning flow 2, access that is updated from the processing blocks 2 and 7 at the same time occurs. Concerning this processing, too, as described already, when the flow identifier (flowinfo1) from the processing block 2 and the flow identifier (flowinfo2) from the processing block 7 match, an internal register that satisfies both requirements can be updated by specifying a write rule based on each packet length b (pktlen1 for the processing block 2 or pktlen2 for the processing block 7).

The function of each processing block is determined in accordance with the speed of a packet input to a pipeline processing portion and the difficulty of the algorithm in the pipeline processing portion. In the example, the function is performed in the processing blocks 1 to 7. However, it is desirable that the number of processing blocks can be increased as required, as processing blocks 1 to N (N≧8). As the speed of the packet input to the pipeline processing portion becomes faster and the algorithm in the pipeline processing portion becomes more difficult, the number of processing blocks needs to be increased. Further, since the number of internal registers in an internal register portion matches the number of processing blocks, the number of internal registers also increases in the same way as the number of processing blocks.

In the example described above, as the configuration of an internal register portion, a plurality of internal registers exist independently, and the function that can retrieve and update the internal register based on a flow identifier is specified. It is desirable that the function of the internal register portion is implemented using a CAM (memory addressable memory). The example described above is described based on shaping processing. However, the features of the present invention are, as described above, that a cache portion is provided following a pipeline processing portion, the flow information about a packet that is being processed in the pipeline processing portion is managed in the cache portion, and the pipeline processing portion performs processing with a virtual scheduling parameter based on the flow information of the cache portion. That is, this processing can be applied to various types of complex algorithms independently of the shaping processing. For example, the polishing processing based on a token packet concerning packet disuse can also be implemented in the same manner instead of the shaping processing.

As described above, with reference to the technology which performs shaping in flow units of a packet, a cache portion is provided that links following the pipeline processing portion which executes processing in units of packet. This cache portion has an internal register that manages the flow information of a packet that is being processed in the pipeline processing portion. In the calculation of the scheduling time of each packet, when there is no packet that belongs to the same flow based on the notification from the cache portion, in the same manner as a conventional method, a predetermined scheduling time of the next packet is calculated based on the predetermined scheduling time of the packet before the one that belongs to the same flow and a token value. When there is a packet that belongs to the same flow in a pipeline processing portion according to the notification from a cache portion, the predetermined scheduling time of the next packet is calculated assuming that a large packet that connects all the packets is virtually input. Consequently, even if packets that belong to the same flow are input successively, the correct scheduling time can always be calculated.

Further, according to the present invention, since the number of pipeline stages of a pipeline processing portion (the number of processing blocks of the pipeline processing portion in FIG. 1) can be realized regardless of the number, the scheduling judgment processing using an optional scheduling parameter can be achieved by increasing the number of pipeline stages accordingly as the speed of high-speed transmission paths increases in the future.

Furthermore, when the shaping processing in a high-speed transmission path is realized without using the technology according to the present invention, although an individual high-speed scheduling judgment circuit must be provided only for the number of flows, the number of flows generally ranges from several thousand to several ten thousand, so an exceedingly large circuit was necessary. In comparison, since the present invention is realized in the pipeline processing that reads management information from a memory in units of flow and a cache portion specified for only the number of stages of the pipeline processing, the shaping processing can be achieved using a small circuit, and so the hardware cost and power consumption can be reduced.

What is claimed is:

1. A pipeline processing type shaping apparatus that calculates a transmission scheduling time for each input packet to said apparatus by performing pipeline processing by a pipeline processing portion which includes a plurality of processing blocks, said apparatus comprising:
   a management memory that stores the most recent scheduling time allocated to a packet, which has been processed by said pipeline processing portion, for each of packet flow identifiers;
   a storage portion that includes a plurality of internal registers, which are equal to the number of processing blocks in said pipeline processing portion, and each stores a number of packets and a total sum length of packets having the same packet flow identifier and currently being processed in said pipeline processing portion; and
   a calculating part that calculates the transmission scheduling time of an input packet, being processed by said pipeline processing portion, in accordance with the most recent scheduling time being managed by said management memory and packet length for which said input packet length and said total sum length of packets stored in said internal register corresponding to the same packet flow identifier as said input packet are added.

2. The pipeline processing type shaping apparatus according to claim 1, wherein the calculating part comprising:
   a reading block that transfers a packet flow identifier of said input packet to said storage portion and receives said total sum length of packets stored in said internal register corresponding to the same packet flow identifier; and
   a calculating block that calculates the transmission scheduling time for said input packet in accordance with the most recent scheduling time being managed by the management memory and packet length for which said input packet length and said total sum length of packets received by said reading block are added.

3. The pipeline processing type shaping apparatus according to claim 1, wherein said storage portion further comprising:
   a storage information update part that increments, in response to an input of packet to said pipeline processing portion, the number of packets and the total sum length of packets stored in one of said internal registers corresponding to a packet flow identifier of said input packet, and decrements, in response to an output of packet from said pipeline processing portion, the number of packets and the total sum length of packets stored in one of said internal registers corresponding to a packet flow identifier of said output packet.

4. The pipeline processing type shaping apparatus according to claim 2, wherein said storage portion further comprising:
   a storage information update part that increments, in response to an input of packet to said pipeline processing portion, the number of packets and the total sum length of packets stored in one of said internal registers corresponding to a packet flow identifier of said input packet, and decrements, in response to an output of packet from said pipeline processing portion, the number of packets and the total sum length of packets stored in one of said internal resisters corresponding to a packet flow identifier of said output packet.

5. A pipeline processing type shaping method that performs the pipeline processing by a pipeline processing portion which includes a plurality of processing blocks for calculating a transmission scheduling time for each input packet to said pipeline processing portion, said method comprising:
   storing, into a management memory, the most recent scheduling time allocated to a packet, which has been processed by said pipeline processing portion, for each of packet flow identifiers;
   storing, into one of internal registers which are equal to the number of processing blocks in said pipeline processing portion, a number of packets and a total sum length of packets having the same packet flow identifier and currently being processed in said pipeline processing portion; and
   calculating the transmission scheduling time of an input packet, being processed by said pipeline processing portion, in accordance with the most recent scheduling time managed by said management memory and packet length for which said input packet length and said total sum length of packets stored in said internal register corresponding to the same packet flow identifier as said input packet are added.

6. The pipeline processing type shaping method according to claim 5, wherein the calculating step comprising:
   reading said total sum length of packets stored in one of said internal registers corresponding to the same packet flow identifier as said input packet; and
   calculating the transmission scheduling time of said input packet in accordance with the most recent scheduling time managed by said management memory and packet length for which said input packet length and said total sum length of packets read in said reading step are added.

7. The pipeline processing type shaping method according to claim 5, further comprising:
   incrementing, in response to an input of packet to said pipeline processing portion, the number of packets and the total sum length of packets stored in one of said internal registers corresponding to a packet flow identifier of said input packet; and decrementing, in response to an output of packet from said pipeline processing portion, the number of packets and the total sum length of packets stored in one of said internal registers corresponding to a packet flow identifier of said output packet.

8. The pipeline processing type shaping method according to claim 6, further comprising:

incrementing, in response to an input of packet to said pipeline processing portion, the number of packets and the total sum length of packets stored in one of said internal registers corresponding to a packet flow identifier of said input packet; and decrementing, in response to an output of packet from said pipeline processing portion, the number of packets and the total sum length of packets stored in one of said internal registers corresponding to a packet flow identifier of said output packet.

9. A recording medium that records a control program of a pipeline processing type shaping method that performs the pipeline processing by a pipeline processing portion which includes a plurality of processing blocks for calculating a transmission scheduling time for each input for performing the method step packet to said pipeline processing portion, said control program comprising:

storing, into a management memory, the most recent scheduling time allocated to a packet, which has been processed by said pipeline processing portion, for each of packet flow identifiers;

storing, into one of internal registers which are equal to the number of processing blocks in said pipeline processing portion, a number of packets and a total sum length of packets having the same packet flow identifier and currently being processed in said pipeline processing portion; and calculating the transmission scheduling time of an input packet, being processed by said pipeline processing portion, in accordance with the most recent scheduling time managed by said management memory and packet length for which said input packet length and said total sum length of packets stored in said internal register corresponding to the same packet flow identifier as said input packet are added.

10. The recording medium that records a control program of a pipeline processing type shaping method according to claim 9, where the control program of the calculating step comprising:

reading said total sum length of packets stored in one of said internal registers corresponding to the same packet flow identifier as said input packet; and calculating the transmission scheduling time of an input packet, being processed by said pipeline processing portion, in accordance with the most recent scheduling time managed by said management memory and packet length for which said input packet length and said total sum length of packets read in said reading step are added.

11. The recording medium according to claim 9, the control program further comprising a control program for:

incrementing, in response to an input of packet to said pipeline processing portion, the number of packets and the total sum length of packets stored one of said internal registers corresponding to a packet flow identifier of said input packet; and decrementing, in response to an output packet from said pipeline processing portion, the number of packets and the total sum length of packets stored in one of said internal registers corresponding to a packet flow identifier of said output packet.

12. The recording medium according to claim 10, the control program further comprising a control program for:

incrementing, in response to an input of packet to said pipeline processing portion, the number of packets and the total sum length of packets stored in one of said internal registers corresponding to a packet flow identifier of said input packet; and decrementing, in response to an output of packet from said pipeline processing portion, the number of packets and the total sum length of packets stored in one of said internal registers corresponding to a packet flow identifier of said output packet.

* * * * *